A. F. GLASER & J. OLSEN.
TRANSMISSION MECHANISM.
APPLICATION FILED JULY 20, 1907.
899,526.
Patented Sept. 29, 1908.
2 SHEETS—SHEET 1.
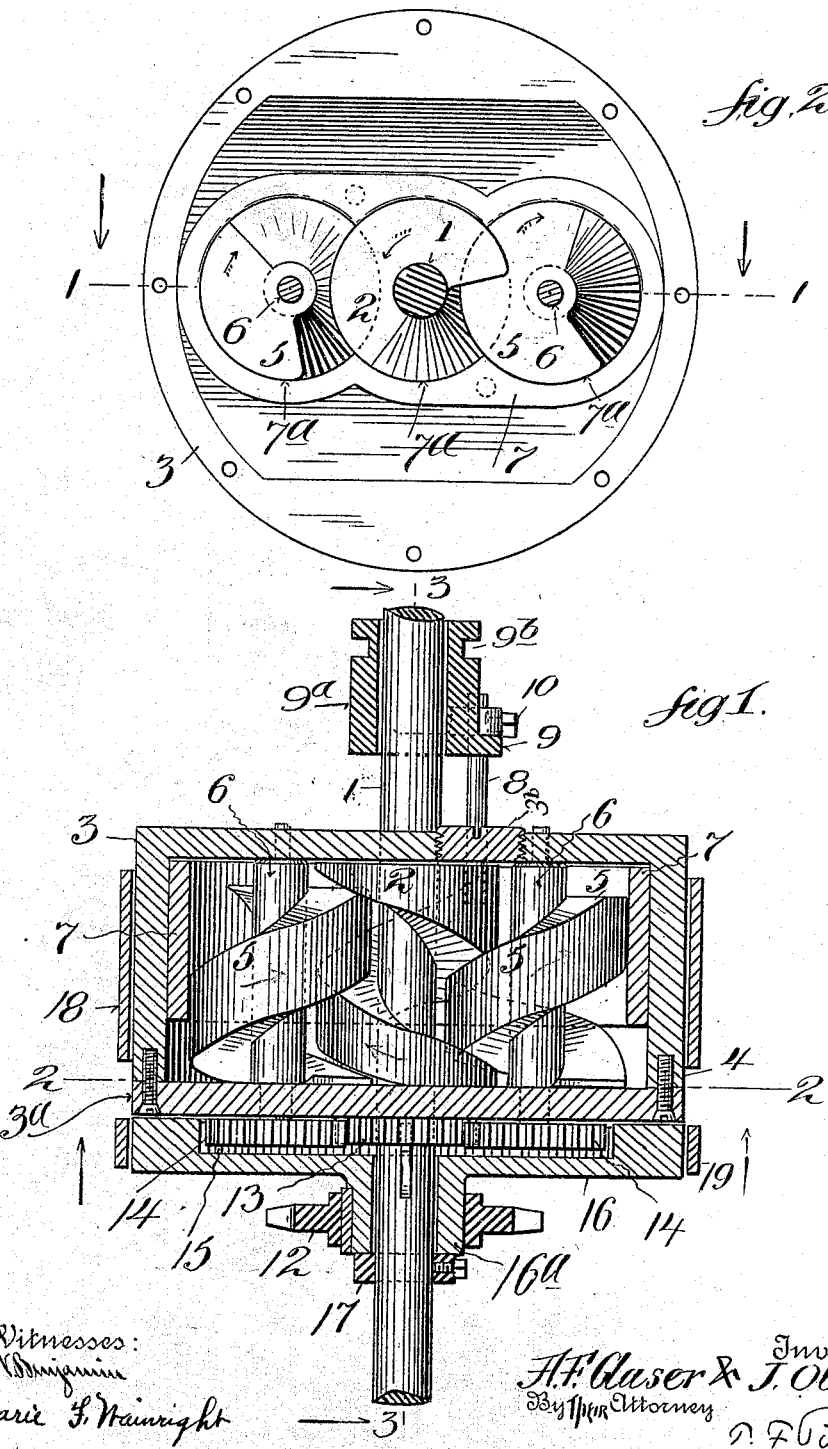
Witnesses:
Inventors
A. F. Glaser & J. Olsen
By their Attorney A. F. GLASER & J. OLSEN.
TRANSMISSION MECHANISM.
APPLICATION FILED JULY 20, 1907.
899,526.
Patented Sept. 29, 1908.
2 SHEETS—SHEET 2.
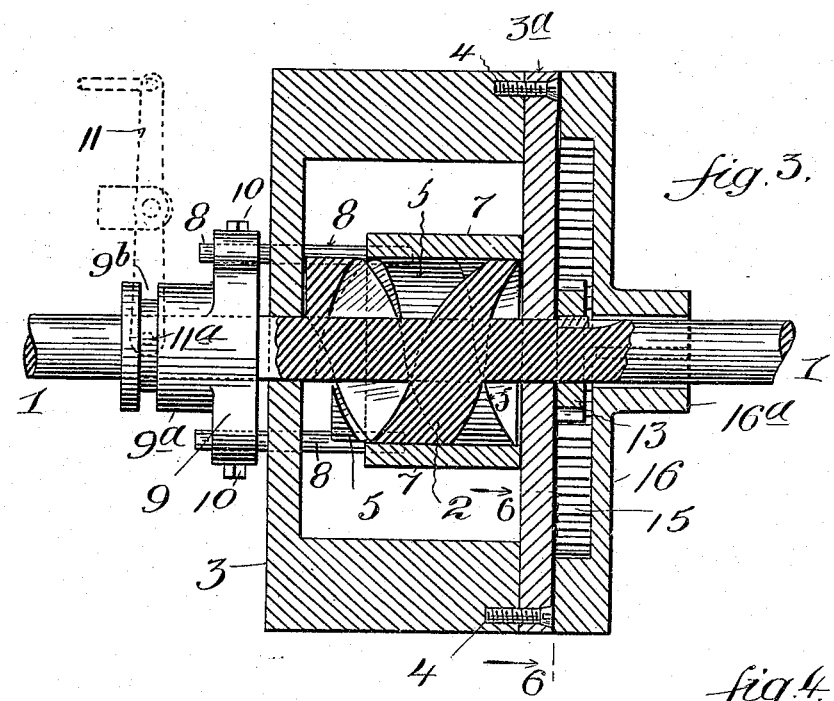
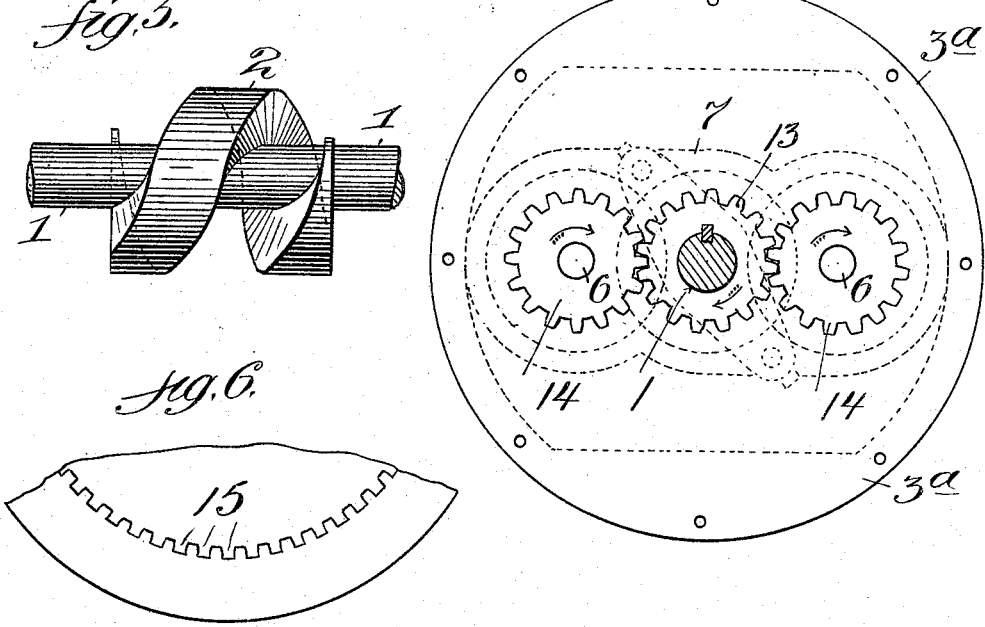
Witnesses:
A. F. Glaser & J. Olsen, Inventors

UNITED STATES PATENT OFFICE.

ADAM F. GLASER, OF JERSEY CITY, AND JOHN OLSEN, OF WHIPPANY, NEW JERSEY, ASSIGNORS OF ONE-THIRD TO GEORGE W. CRANE, OF RAHWAY, NEW JERSEY.

TRANSMISSION MECHANISM.

No. 899,526.      Specification of Letters Patent.      Patented Sept. 29, 1908.

Application filed July 20, 1907. Serial No. 384,824.

*To all whom it may concern:*

Be it known that we, ADAM F. GLASER and JOHN OLSEN, citizens of the United States, and residents, respectively, of Jersey City, Hudson county, New Jersey, and Whippany, Morris county, New Jersey, have invented certain new and useful Improvements in Transmission Mechanism, of which the following is a specification.

The object of our invention is to provide improved means for rotating a driven member at variable speeds as desired from a driving member or shaft which may constantly rotate in a single direction, such as the driving shaft of a gas engine, and wherein the parts will be strong and durable and not liable to get out of order.

In carrying out our invention we provide a driving part or shaft with a worm, and a rotatable casing surrounding said shaft and carrying a worm or worms, and surrounding said worms within said casing we place an adjustable shield or valve member within which said worms may rotate, and within said casing we place a fluid or semi-fluid like substance, such as powdered or granular graphite preferably mixed with a liquid, such as water or oil, whereby when said shield or valve member is in one position and the worms rotate, said fluid-like substance will be caused to flow or circulate within the casing without causing the same to rotate against the resistance of a load; and when said shield or valve member is in the closed position and the worms rotate, said fluid substance will be jammed or compressed by the worms within the shield or valve member in such manner as to cause the casing and worms to revolve in unison as one united structure; and when said shield or valve member is in an intermediate position the fluid substance will be caused to flow or circulate more or less slowly within the casing, and the difference between the flowing of the fluid and the compressing action of the worms thereon will cause the casing to rotate at an intermediate speed. Means are provided for adjusting said shield or valve member as required and holding it in positions of adjustment. Said mechanism is provided with a transmission or driven member to transmit the rotation of said casing as desired in the direction of rotation of the driving part. We also provide means for rotating said transmission or driven member in the direction reverse to that of the rotation of the casing, and for this purpose we have shown an internal gear connected with the transmission or driven member and in mesh with gears driven with said worms, a suitable brake being provided for limiting the rotation of said casing, whereby through said gearing the transmission or driven member will be rotated in the direction reverse to the direction of rotation of the driving part or shaft.

The invention further comprises the novel details of improvement and combinations of parts that will be more fully hereinafter set forth and then pointed out in the claims.

Reference is to be had to the accompanying drawings forming part hereof, wherein, Figure 1 is a sectional view of our improvements, the section being taken substantially on the line 1, 1, in Fig. 2; Fig. 2 is a sectional view taken on the line 2, 2, in Fig. 1, looking in the direction of the arrows; Fig. 3 is a partly section view taken substantially on the line 3, 3, in Fig. 1; Fig. 4 is an end view illustrating the gearing, the internal gear being removed; Fig. 5 is a detail view of the driving shaft and its worm, and Fig. 6 is a detail of the internal gear.

Similar numerals of reference indicate corresponding parts in the several views.

The numeral 1 indicates a driving member or shaft provided with a worm 2 secured thereto in suitable manner or formed thereon, and at 3 is a suitable casing mounted freely upon shaft 1 so that the latter may rotate therein, said casing being shown provided with a cover $3^a$ which may be detachably secured thereon by screws 4 or in other desired manner to form a tightly closed casing.

At 5 are worms corresponding to worm 2 and meshing therewith, being formed reversely to worm 2 so as to rotate in the direction opposite to the direction of rotation of worm 2, whereby a suitable fluid like substance within the casing will be forced by said worms toward the end of the casing. The fluid-like substance may be placed in the casing through an opening closed by a plug $3^b$. The worms 5 are suitably journaled in casing 3, as by being mounted upon shafts 6 journaled at their ends in suitable bearings in the casing and in cover $3^a$. Within casing 1 and surrounding worms 2 and 5 is a sliding or adjustable shield or valve member 7, open at opposite ends and shown closely fitting said worms, the inner surfaces of said valve member being shown curved at 7ª to fit the outer surfaces of the worms more or less snugly to limit or prevent the escape of fluid between the worms and the shield, and to compel the fluid to flow along the worms from one end toward the other. Means are provided for adjusting the valve member 7 along the worms within casing 3 as desired. For this purpose we have shown rods 8 secured to valve member 7 and passing through openings in a wall of casing 3, and to said rods is attached a cross bar 9, as by screws 10, which bar is shown provided with a hub 9ª mounted to slide upon shaft 1 and within which said shaft rotates. The bar 9 may be shifted by suitable means, such, for instance, as a fork on a lever 11 having pins 11ª engaging a groove 9ᵇ in hub 9, whereby when said lever is adjusted the valve member 7 will be shifted along the worms, and said lever may be operated and held set in any desired position by any suitable or well-known means. When casing 3 is filled with a suitable fluid or fluid-like substance, such as powdered or granular graphite, preferably mixed with a liquid such as water or oil, and shaft 1 is rotated in the direction of the arrow a in Fig. 2, the worms 2 and 5 will propel such fluid toward the bottom of Fig. 1. With valve member 7 in the position shown in Fig. 1 such fluid will be propelled without causing rotation of casing 3 against the resistance of a load, but when valve member 7 is adjusted to the position shown in Fig. 3 the worms will compress the fluid substance within shield 7 and against the casing and thereby unite the worms and valve member firmly, whereby casing 3 will be carried around by shaft 1 in the same direction and at the same speed as said shaft. If valve member 7 be adjusted to intermediate positions the worms will cause the fluid-like substance to flow through member 7 from the left in Fig. 3 toward the right and the passage of such fluid from within said member toward the right will cause casing 3 to rotate at a speed, respecting the speed of shaft 1, proportioned to the ability of the fluid to flow from the valve member 7, the fluid-like substance then being continuously taken in at one end of the worms and delivered at the other end.

Power may be transmitted from casing 3 by any suitable driven means connected therewith. We have shown a driven member 12 connected with casing 3 in such manner that said member may be rotated in opposite directions. For this purpose we provide a gear 13 secured to shaft 1 and in mesh with gears 14 that mesh with an internal gear 15 surrounding gears 14 and shown carried by a disk or support 16 provided with a hub 16ª journaled on shaft 1 and to which hub the driven member 12 is attached, a collar 17 secured on shaft 1 adjacent hub 16ª serving to hold internal gear 15 in position respecting gear 14 and casing 3. We have shown gears 14 secured upon shafts 6 whereby said gears assist in the rotation of worms 5 from shaft 1.

When valve member 7 is at the right, as in Fig. 3, all the parts will be locked firmly together and driven member 12 will thus be rotated at the same speed and in the same direction as shaft 1, but when valve member 7 is in an intermediate position the member 12 will be rotated at an intermediate speed in the same direction as shaft 1 by reason of the rotation of casing 3 and proportioned to the rolling of gears 14 within internal gear 15. To cause reverse rotation of driven member 12 a suitable brake is applied to casing 3, such as a brake band 18 surrounding said casing and operated in any well known manner, for stopping or limiting the rotation of said casing, while valve member 7 is in the position shown in Fig. 1, whereby the rotation of gear 15 through gears 14 rotating on their axes will cause internal gear 15 to rotate reversely to the direction of rotation of shaft 1 to rotate driven member 12 reversely. A brake band 19 surrounding gear 15, or otherwise applied to driven member 12, may be utilized to stop or retard the rotation of said member while shaft 1 continues to rotate, shield or valve member 7 then being in the position shown in Fig. 1.

Our improvements are mounted upon the driving shaft 1 without requiring other support, and casing 3 is thus free to rotate as required, and the parts are strong and durable and not liable to get out of order, as at high speed all parts are locked firmly together and at other speeds the worms merely propel or circulate the fluid-like substance within the casing and are thereby continuously lubricated and wear on the parts is reduced.

Our improvements may be used in automobiles for transmitting variable speeds from the engine shaft to the drive wheels, and in other relations requiring delivery of different speeds from a driver.

While we have shown two worms 5 meshing with worm 2 it will be understood that one or more worms such as 5 may be utilized as desired, the valve member 7 being formed to accord with the number of worms contained within the same.

While we have illustrated a convenient embodiment of our invention the same is not limited to the details and arrangements shown as the same may be varied without departing from the spirit of our invention.

Having now described our invention what we claim is:

1. A transmission mechanism comprising a driving shaft provided with a worm, a casing inclosing said worm, a worm connected with said casing, a valve member surrounding said worms, and means for adjusting said valve member with respect to said worms to cause a fluid like substance operated by said worms to cause rotation of said casing.

2. A transmission mechanism comprising a driving shaft provided with a worm, a casing surrounding said shaft and provided with a worm formed reverse to the first named worm and meshing therewith, a valve member within said casing surrounding said worms, and means to adjust said valve member at will.

3. A transmission mechanism comprising a driving shaft provided with a worm, a casing surrounding the same, a worm carried by said casing and meshing with the first named worm, a valve member surrounding said worms and of less width than the length of said worms adapted to be adjusted along the worms within the casing to more or less open or close the delivery ends of said worms, and means for adjusting said valve member.

4. A transmission mechanism comprising a shaft provided with a worm, a casing surrounding said shaft and mounted to rotate freely thereon, a worm carried by said casing and formed reverse to the first named worm and in mesh therewith, a valve member surrounding said worms and having its opposite ends open and of less width than the length of said worms, adapted to be adjusted along said worms within the casing, said valve member having its inner surfaces curved substantially corresponding to the peripheries of said worms, and means to adjust said valve member within said casing.

5. The combination of a shaft provided with a worm, a casing mounted freely upon said shaft, worms journaled on said casing on opposite sides of the first named worm and formed reversely thereto and in mesh therewith, a valve member surrounding said worms and arranged to be adjusted to permit more or less fluid-like substance within said casing to be forced by the worms through the casing, and means to operate said valve like member.

6. A transmission mechanism comprising a driving shaft provided with a worm, a casing inclosing said worm, a worm connected with said casing, a valve member surrounding said worms, a rod connected with said valve member and projecting through the casing, an arm connected with said rod, and means for shifting said arm while permitting rotation thereof.

7. A transmission mechanism provided with a worm, a casing inclosing said worm, a worm connected with said casing, and means adjustable along said worms to cause said worms to operate a fluid-like substance at will more or less, in the direction of the axes of the worms, to cause rotation of said casing.

ADAM F. GLASER.
JOHN OLSEN.

Witnesses:
T. F. BOURNE,
MARIE F. WAINRIGHT.